United States Patent
Minachi et al.

(10) Patent No.: US 7,713,433 B2
(45) Date of Patent: May 11, 2010

(54) FERRITE MAGNETIC MATERIAL AND FERRITE SINTERED MAGNET

(75) Inventors: Yoshihiko Minachi, Tokyo (JP); Noboru Ito, Tokyo (JP); Junichi Nagaoka, Tokyo (JP); Shunsuke Kurasawa, Tokyo (JP); Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 560 days.

(21) Appl. No.: 10/598,222

(22) PCT Filed: Mar. 3, 2005

(86) PCT No.: PCT/JP2005/003568
§ 371 (c)(1),
(2), (4) Date: Jun. 29, 2007

(87) PCT Pub. No.: WO2005/085153
PCT Pub. Date: Sep. 15, 2005

(65) Prior Publication Data
US 2007/0246681 A1    Oct. 25, 2007

(30) Foreign Application Priority Data
Mar. 4, 2004    (JP) .............................. 2004-060245

(51) Int. Cl.
*H01F 1/10*    (2006.01)
*C04B 35/26*    (2006.01)
(52) U.S. Cl. ................... 252/62.63; 252/62.59
(58) Field of Classification Search .............. 252/62.63; 264/428, 429, 611, 613, 612
See application file for complete search history.

(56) References Cited

U.S. PATENT DOCUMENTS

| | | | | |
|---|---|---|---|---|
| 4,397,796 | A | * | 8/1983 | Lotgering et al. ........... 264/428 |
| 2004/0053075 | A1 | | 3/2004 | Oda et al. |
| 2004/0061090 | A1 | | 4/2004 | Oda et al. |
| 2007/0009767 | A1 | * | 1/2007 | Minachi et al. .......... 428/836.2 |

FOREIGN PATENT DOCUMENTS

| | | | |
|---|---|---|---|
| JP | 63-162532 | A | 7/1988 |
| JP | 02-180004 | A | 7/1990 |
| JP | 06-290923 | A | 10/1994 |
| JP | 11-251127 | A | 9/1999 |
| JP | 2001-052943 | A | 2/2001 |
| WO | WO 2005/013293 | * | 2/2005 |

OTHER PUBLICATIONS

Crystal Stability and Magnetic Properties of W-type Hexagonal Ferrite Srl-xBax[ZnLi0.5Fe0.5]Fe16O27, Kemichiro Suwa et al., Mar. 8, 1996.

* cited by examiner

*Primary Examiner* — C. Melissa Koslow
(74) *Attorney, Agent, or Firm* — Pearne & Gordon LLP

(57) ABSTRACT

W-type ferrite has improved magnetic properties, in particular, coercive force. A high coercive force (HcJ) and a high residual magnetic flux density (Br) can be simultaneously attained by a ferrite magnetic material comprising an oxide having a composition wherein metal elements Sr, Ba and Fe in total have a composition ratio represented by the formula $Sr_{(1-x)}Ba_xFe^{2+}{}_aFe^{3+}{}_b$ in which $0.03 \leq x \leq 0.80$, $1.1 \leq a \leq 2.4$, and $12.3 \leq b \leq 16.1$. The ferrite magnetic material can form any of a ferrite sintered magnet, a ferrite magnet powder, a bonded magnet as a ferrite magnet powder dispersed in a resin, and a magnetic recording medium as a film-type magnetic phase. As for the ferrite sintered magnet, there can be attained a fine sintered structure that has a mean grain size of 0.6 μm or less.

15 Claims, 6 Drawing Sheets

FIG. 1

| No. | Mixing composition | | | Composition analysis values | | | HcJ [Oe] | Br [G] | Hk/HcJ [%] | Mean grain size [μm] | Phases |
|---|---|---|---|---|---|---|---|---|---|---|---|
| | a+b | a | x | a | b | x | | | | | |
| 1 | 18 | 1.7 | 0 | 1.7 | 15.1 | 0 | 2845 | 4592 | 79.08 | 0.628 | W+M |
| 2 | 18 | 1.7 | 0.05 | 1.7 | 15.1 | 0.047 | 3007 | 4627 | 85.04 | 0.544 | W+M |
| 3 | 18 | 1.7 | 0.1 | 1.7 | 15.1 | 0.093 | 3187 | 4629 | 85.31 | 0.494 | W+M |
| 4 | 18 | 1.7 | 0.2 | 1.7 | 15.1 | 0.19 | 3388 | 4702 | 85.77 | 0.490 | W+M |
| 5 | 18 | 1.7 | 0.3 | 1.7 | 15.1 | 0.28 | 3406 | 4699 | 90.81 | 0.469 | W+M |
| 6 | 18 | 1.7 | 0.4 | 1.7 | 15.1 | 0.37 | 3376 | 4705 | 86.99 | 0.487 | W+M |
| 7 | 18 | 1.7 | 0.5 | 1.7 | 15.1 | 0.47 | 3315 | 4663 | 86.72 | 0.489 | W+M |
| 8 | 18 | 1.7 | 0.6 | 1.7 | 15.1 | 0.56 | 3251 | 4660 | 86.92 | 0.498 | W+M |
| 9 | 18 | 1.7 | 0.7 | 1.7 | 15.1 | 0.65 | 3184 | 4631 | 86.81 | 0.511 | W+M |
| 10 | 18 | 1.7 | 0.8 | 1.7 | 15.1 | 0.75 | 3103 | 4615 | 86.31 | 0.513 | W+M |
| 11 | 18 | 1.7 | 0.9 | 1.7 | 15.1 | 0.84 | 3010 | 4575 | 86.11 | 0.547 | W+M |
| 12 | 18 | 1.7 | 1 | 1.7 | 15.1 | 0.93 | 2889 | 4532 | 85.62 | 0.602 | W+M |

Note: $a, b, x: Sr_{(1-x)}Ba_xFe^{2+}{}_aFe^{3+}{}_bO_{27}$

FIG. 5

| No. | Additive amounts in second milling [wt%] | | | | HcJ [Oe] | Br [G] | Hk/HcJ [%] |
|---|---|---|---|---|---|---|---|
| | $SiO_2$ | $CaCO_3$ | $SrCO_3$ | $BaCO_3$ | | | |
| 13 | 0.6 | 0 | 0.7 | 1.4 | 3473 | 4606 | 89.97 |
| 14 | | | | 1.75 | 3483 | 4603 | 91.50 |
| 15 | | | 1.05 | 1.05 | 3385 | 4600 | 91.37 |
| 16 | | | | 1.4 | 3397 | 4602 | 90.13 |
| 17 | | 0.35 | 0 | 1.4 | 3309 | 4660 | 92.53 |
| 18 | | | | 1.75 | 3595 | 4656 | 92.12 |
| 19 | | | | 2.1 | 3736 | 4647 | 91.99 |
| 20 | | | | 2.45 | 3699 | 4632 | 91.24 |
| 21 | | | 0.35 | 0.7 | 3254 | 4705 | 92.19 |
| 22 | | | | 1.05 | 3443 | 4635 | 92.56 |
| 23 | | | | 1.4 | 3626 | 4660 | 86.18 |
| 24 | | | | 1.75 | 3718 | 4611 | 89.08 |
| 25 | | | 0.7 | 0.7 | 3571 | 4687 | 92.74 |
| 26 | | | | 1.05 | 3632 | 4675 | 91.18 |
| 27 | | | | 1.4 | 3711 | 4660 | 90.94 |
| 28 | | | 1.05 | 0.7 | 3586 | 4702 | 91.49 |
| 29 | | | | 1.05 | 3693 | 4616 | 89.68 |
| 30 | | | 1.4 | 0 | 3486 | 4660 | 90.53 |
| 31 | | | | 0.35 | 3583 | 4623 | 91.57 |
| 32 | | | | 0.7 | 3458 | 4608 | 88.54 |
| 33 | | 0.7 | 0 | 0.7 | 3180 | 4635 | 86.47 |
| 34 | | | | 1.05 | 3388 | 4693 | 88.54 |
| 35 | | | | 1.4 | 3486 | 4678 | 91.42 |
| 36 | | | | 1.75 | 3650 | 4641 | 90.73 |
| 37 | | | | 2.1 | 3571 | 4632 | 85.74 |
| 38 | | | 0.35 | 0.7 | 3376 | 4656 | 92.56 |
| 39 | | | | 1.05 | 3534 | 4663 | 93.71 |
| 40 | | | | 1.4 | 3589 | 4687 | 90.55 |
| 41 | | | | 1.75 | 3400 | 4641 | 88.23 |
| 42 | | | 0.7 | 0.7 | 3614 | 4666 | 88.18 |
| 43 | | | | 1.05 | 3638 | 4687 | 87.60 |
| 44 | | | | 1.4 | 3565 | 4660 | 87.65 |
| 45 | | | 1.05 | 0.35 | 3602 | 4650 | 93.69 |
| 46 | | | | 0.7 | 3522 | 4681 | 94.03 |
| 47 | | 1.4 | 0.35 | 1.4 | 3110 | 4699 | 86.39 |
| 48 | 0.9 | 0.35 | 0.7 | 1.4 | 3143 | 4641 | 90.76 |
| 49 | | | 0.35 | 1.05 | 3309 | 4684 | 86.88 |
| 50 | | 0.7 | 0.7 | 0.7 | 3315 | 4684 | 90.49 |
| 51 | | | | 1.05 | 3498 | 4629 | 89.33 |
| 52 | | | | 1.4 | 3583 | 4635 | 90.70 |
| 53 | | | 1.05 | 1.05 | 3583 | 4629 | 92.43 |

FIG. 6

| Additive amount [wt%] | | Composition analysis values | | |
|---|---|---|---|---|
| $SrCO_3$ | $BaCO_3$ | a | b | x |
| 0 | 0.7 | 1.7 | 15.4 | 0.3369 |
| 0 | 1.05 | 1.7 | 14.9 | 0.3522 |
| 0 | 1.4 | 1.7 | 14.5 | 0.3683 |
| 0 | 1.75 | 1.7 | 14.1 | 0.3822 |
| 0 | 2.1 | 1.7 | 13.8 | 0.3994 |
| 0 | 2.45 | 1.7 | 13.4 | 0.412 |
| 0.35 | 0.7 | 1.7 | 14.8 | 0.3251 |
| 0.35 | 1.05 | 1.7 | 14.4 | 0.3416 |
| 0.35 | 1.4 | 1.7 | 14.0 | 0.3569 |
| 0.35 | 1.75 | 1.7 | 13.6 | 0.3614 |
| 0.7 | 0.7 | 1.7 | 14.3 | 0.2873 |
| 0.7 | 1.05 | 1.7 | 13.9 | 0.3054 |
| 0.7 | 1.4 | 1.7 | 13.5 | 0.3204 |
| 0.7 | 1.75 | 1.7 | 13.2 | 0.3365 |
| 1.05 | 0.35 | 1.7 | 14.1 | 0.2873 |
| 1.05 | 0.7 | 1.7 | 13.8 | 0.3054 |
| 1.05 | 1.05 | 1.7 | 13.4 | 0.3204 |
| 1.05 | 1.4 | 1.7 | 13.1 | 0.3365 |
| 1.4 | 0 | 1.7 | 14.0 | 0.2617 |
| 1.4 | 0.35 | 1.7 | 13.6 | 0.2782 |
| 1.4 | 0.7 | 1.7 | 13.3 | 0.2955 |

Note:
a, b, x: $Sr_{(1-x)}Ba_xFe^{2+}{}_aFe^{3+}{}_bO_{27}$

FIG. 7

| Composition analysis values | | | HcJ [Oe] | Br [G] | Hk/HcJ [%] | Phases |
|---|---|---|---|---|---|---|
| x | a | b | | | | |
| 0.28 | 1.0 | 15.1 | 3402 | 4588 | 88 | W+M |
| | 1.2 | | 3355 | 4610 | 89 | W+M |
| | 1.5 | | 3332 | 4688 | 91 | W+M |
| | 1.8 | | 3456 | 4691 | 89 | W+M |
| | 2.0 | | 3334 | 4667 | 87 | W |
| | 2.2 | | 3077 | 4670 | 86 | W |
| | 2.5 | | 2882 | 4651 | 79 | W+S |
| | 1.7 | 12.2 | 2891 | 4668 | 80 | W+M |
| | | 13.5 | 3022 | 4667 | 88 | W+M |
| | | 14.5 | 3398 | 4690 | 88 | W+M |
| | | 15.5 | 3402 | 4687 | 87 | W+M |
| | | 15.8 | 3325 | 4678 | 88 | W+M |
| | | 16.0 | 3365 | 4615 | 91 | W+M |
| | | 16.2 | 3403 | 4592 | 89 | W+M |

Note:
a, b, x: $Sr_{(1-x)}Ba_xFe^{2+}{}_aFe^{3+}{}_bO_{27}$

FERRITE MAGNETIC MATERIAL AND FERRITE SINTERED MAGNET

TECHNICAL FIELD

The present invention relates to a hard ferrite material, in particular, a ferrite magnetic material that can be suitably used for a W-type hexagonal ferrite magnet.

BACKGROUND ART

Magnetoplumbite-type hexagonal ferrites typified by $SrO.6Fe_2O_3$, that is, M-type ferrites have hitherto been dominantly used for ferrite sintered magnets. As for such M-type ferrite magnets, efforts have been made to achieve high performance thereof, focusing on that the ferrite grain sizes are made closer to the single domain grain sizes, that ferrite grains are aligned in a magnetic anisotropic direction, and that high densities are achieved in the magnets concerned. As a result of such efforts, the properties of M-type ferrite magnets have approached the upper limits thereof, so that it is difficult to expect drastic improvements of the magnetic properties under the present circumstances.

The W-type ferrite magnet has been known as a ferrite magnet that has potentiality to surpass in magnetic properties the M-type ferrite magnet. The W-type ferrite magnet is higher by about 10% insaturationmagnetization ($4\pi Is$) than the M-type ferrite magnet and is of the same order in anisotropic magnetic field as the M-type ferrite magnet. Patent Document 1 (National Publication of International Patent Application No. 2000-501893) discloses a W-type ferrite magnet having a composition represented by $SrO.2(FeO).n(Fe_2O_3)$, wherein n falls within a range from 7.2 to 7.7, and a sintered body thereof has a mean grain size of 2 μm or less and a (BH)max of 5 MGOe or more.

Patent Document 2 (Japanese Patent Laid-Open No. 11-251127) discloses a W-type ferrite magnet which has a maximum energy product surpassing the maximum energy products of the conventional M-type ferrites and has a composition different from the compositions of the conventional W-type ferrite magnets, wherein the fundamental composition thereof is represented by a formula $MO.xFeO.(y-x/2)Fe_2O_3$ (M being one or more of Ba, Sr, Pb and La) with the proviso that $1.7 \leq x \leq 2.1$ and $8.8 \leq y \leq 9.3$ in terms of atomic ratios. A magnet disclosed in Patent Document 2 having a composition of $SrO.2FeO.8Fe_2O_3$ has properties such that the residual magnetic flux density (Br) is 4800 G, the coercive force (iHc) is 3000 Oe, the maximum energy product ((BH)max) is 5.5 MGOe.

[Patent Document 1]: National Publication of International Patent Application No. 2000-501893

[Patent Document 2]: Japanese Patent Laid-Open No. 11-251127

DISCLOSURE OF THE INVENTION

As described above, various W-type ferrite magnets have been studied, but attainment of higher magnetic properties has been demanded. In particular, for the purpose of practically applying W-type ferrites, it is important that the coercive force of 3000 Oe or more be obtained. Needless to say, it should be avoided that the increase of the coercive force involves the lowering of the residual magnetic flux density. In other words, for the purpose of practically applying W-type ferrites, it is essential that both of the coercive force and the residual magnetic flux density each be at a high level simultaneously.

The present invention has been achieved on the basis of the technical problems described above, and an object of the present invention is to improve the magnetic properties of the W-type ferrite, in particular, the coercive force of the W-type ferrite.

The present inventors have completed the present invention by verifying that high magnetic properties that cannot be obtained by singly using any one of Sr and Ba can be attained by including Sr and Ba simultaneously at predetermined ratios although the W-type hexagonal ferrite singly including Sr has hitherto been studied. In other words, the present invention is a ferrite magnetic material comprising an oxide having a composition wherein metal elements of Sr, Ba and Fe in total have a composition ratio represented by the formula $Sr_{(1-x)}Ba_xFe^{2+}_aFe^{3+}_b$ in which $0.03 \leq x \leq 0.80$, $1.1 \leq a \leq 2.4$, and $12.3 \leq b \leq 16.1$. In the oxide, when Sr and Ba are all divalent, and a=2 and b=16, the number of atoms of oxygen O is 27; the number of atoms of oxygen O is varied depending on the valencies of Sr and Ba and the values of a and b.

The ferrite magnetic material of the present invention is made to have a W-type hexagonal ferrite forming the main phase thereof by adopting the above described composition. The formation of the main phase as referred to herein refers to the case in which the main phase ratio is 50% or more in terms of molar ratio.

The ferrite magnetic material of the present invention preferably includes one or two of a Ca constituent and a Si constituent as additives in the following contents, respectively, in terms of $CaCO_3$ and $SiO_2$: $CaCO_3$: 0 to 3.0 wt % and $SiO_2$: 0.2 to 1.4 wt %.

The ferrite magnetic material according to the present invention can be practically applied in various forms. Specifically, the ferrite magnetic material according to the present invention can be applied to a ferrite sintered magnet. When the ferrite magnetic material according to the present invention is applied to a ferrite sintered magnet, the sintered body preferably has a mean grain size of 0.6 μm or less because such a mean grain size can attain a coercive force (HcJ) of 3000 Oe or more. The ferrite magnetic material according to the present invention can also be applied to a ferrite magnet powder. The ferrite magnet powder can be used for a bonded magnet. In other words, the ferrite magnetic material according to the present invention can form a bonded magnet as a ferrite magnet powder dispersed in a resin. The ferrite magnetic material according to the present invention can also form a magnetic recording medium as a film-type magnetic phase. The mean grain size as referred to in the present invention is a number mean grain size, the measurement method of which will be described later.

The ferrite sintered magnet according to the present invention includes, as a magnetic phase, a W-type hexagonal ferrite including Sr and Ba and is comprised of a sintered body having a mean grain size of 0.6 μm or less. The ferrite sintered magnet has excellent magnetic properties such that the coercive force (HcJ) is 3000 Oe or more, the residual magnetic flux density (Br) is 4600 G or more and the squareness ratio (Hk/HcJ) is 85% ormore. Suchproperties canbe obtained when Ba/Sr+Ba (molar ratio) is 0.03 to 0.80.

As a method for producing the above described ferrite sintered magnet according to the present invention, there is provided a method for producing a ferrite sintered magnet that includes a step A of calcining a raw material powder mixture including Sr, Ba and Fe; a step B of pulverizing the calcined body obtained in the step A; a step C of milling to a predetermined particle size the pulverized powder obtained in the step B; a step D of compacting in a magnetic field the milled powder obtained in the step C; and a step E of obtaining a sintered body, including a W-type hexagonal ferrite as a magnetic phase, by sintering the compacted body obtained in the step D.

The present invention provides a ferrite magnetic material, in particular, a sintered magnet that includes Sr and Ba simultaneously in the W-type hexagonal ferrite. For the purpose of obtaining such a ferrite magnetic material, the raw material powder mixture includes Sr and Ba, but Sr and/or Ba can also be added after calcination. It is, however, necessary that the addition of Sr and/or Ba after calcination be made in advance of the compacting step D in a magnetic field.

In the method for producing a ferrite sintered magnet according to the present invention, it is preferable for the purpose of improving the magnetic properties that the milling step C includes: a first milling step of milling the pulverized powder to a predetermined particle size; a powder heat treatment step of keeping the milled powder obtained in the first milling step at a predetermined temperature for a predetermined time in a atmosphere having an oxygen concentration of 10 vol % or less; and a second milling step of milling the milled powder, subjected to the powder heat treatment step, to a predetermined particle size.

As described above, according to the present invention, the use of a W-type hexagonal ferrite including Sr and Ba simultaneously in a predetermined ratio can improve the magnetic properties, in particular, the coercive force (HcJ) as compared to W-type hexagonal ferrites that have hitherto been known and include Sr alone. Specifically, the use of such a W-type hexagonal ferrite including Sr and Ba simultaneously can attain a coercive force (HcJ) of 3000 Oe or more and a residual magnetic flux density (Br) of 4600 G or more.

BRIEF DESCRIPTION OF THE DRAWINGS

FIG. 1 is a table showing the compositions and the magnetic properties of the magnets produced in Example 1;

FIG. 5 is a table showing the magnetic properties of the magnets produced in Example 2;

FIG. 6 is a table showing the compositions of the magnets produced in Example 2; and FIG. 7 is a table showing the compositions and the magnetic properties of the magnets produced in Example 3.

BEST MODE FOR CARRYING OUT THE INVENTION

Figure 2:
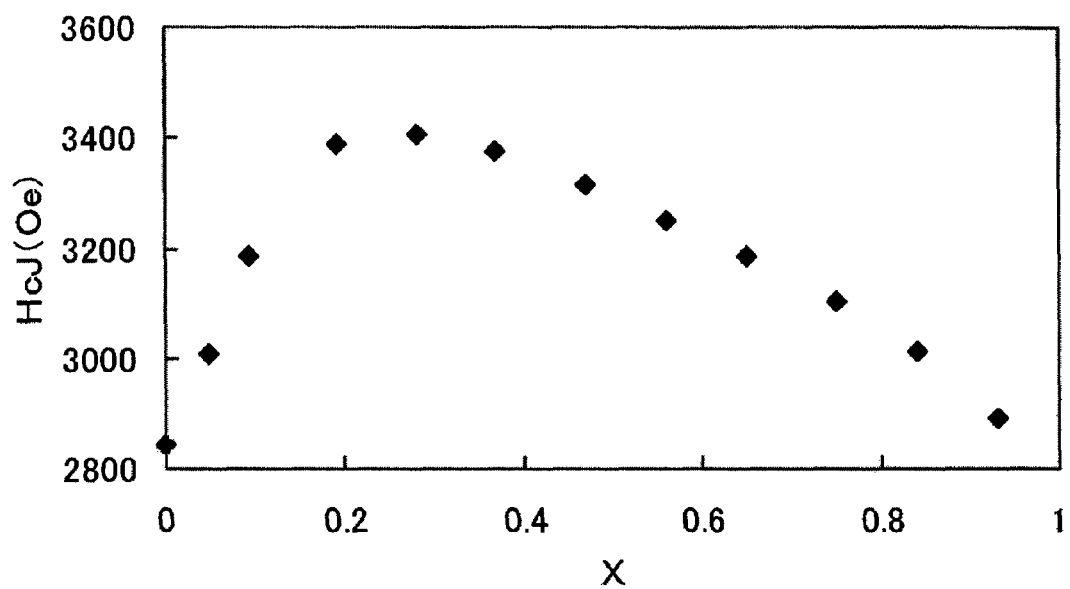
FIG. 2 is a graph showing the relation between the "x" value in $Sr_{(1-x)}Ba_xFe^{2+}{}_aFe^{3+}{}_bO_{27}$ and the coercive force (HcJ) in Example 1.

The present invention will be described in detail below on the basis of the embodiments.

<Compositions>

The ferrite magnetic material of the present invention comprises an oxide having a composition wherein metal elements Sr, Ba and Fe in total have a composition ratio represented by the formula (1) $Sr_{(1-x)}Ba_xFe^{2+}{}_aFe^{3+}{}_b$ in which $0.03 \leq x \leq 0.80$, $1.1 \leq a \leq 2.4$, and $12.3 \leq b \leq 16.1$.

In the oxide, when Sr and Ba are all divalent and "a"=2 and "b"=16, the number of atoms of oxygen O is 27 as shown in the following formula (2); however, the number of atoms of oxygen O is varied depending on the valencies of Sr and Ba and the values of "a" and "b". In Examples to be described later, the number of atoms of oxygen O is presented to be 27 irrespective of the values of "x", "a" and "b", but the actual number of atoms of oxygen O deviates from this value of 27 in some cases, but the present invention also includes such cases.

$$Sr_{(1-x)}Ba_xFe^{2+}{}_aFe^{3+}{}_bO_{27} \qquad (2)$$

Here, "x", "a" and "b" in formulas (1) and (2) each represents a molar ratio.

The ferrite magnetic material of the present invention is characterized by including Sr and Ba simultaneously, and the simultaneous inclusion of these two atoms makes it possible to improve the magnetic properties, in particular, the coercive force. The reason for the improvement of the coercive force is not clear, but the simultaneous inclusion of Sr and Ba makes finer the grains constituting the sintered body, and conceivably the grains made finer contribute to the improvement of the coercive force.

In above formula (1), the improvement of the magnetic properties cannot be enjoyed when "x" is less than 0.03 or exceeds 0.80. Accordingly, in the present invention, "x" is set to fall within the range of $0.03 \leq x \leq 0.80$. The preferable range of "x" is $0.10 \leq x \leq 0.65$, and more preferable range of "x" is $0.15 \leq x \leq 0.50$.

In above formula (1), "a" representing the ratio of $Fe^{2+}$ is set to fall within a range of $1.1 \leq a \leq 2.4$. When "a" is less than 1.1, M phase and $Fe_2O_3$ (hematite) phase lower in the saturation magnetization ($4\pi Is$) than the W phase are generated to lower the saturation magnetization ($4\pi Is$). On the other hand, when "a" exceeds 2.4, the spinel phase is generated to lower the coercive force (HcJ). Accordingly, "a" is set to fall within the range of $1.1 \leq a \leq 2.4$. The preferable range of "a" is $1.5 \leq a \leq 2.4$, and more preferable range of "a" is $1.6 \leq a \leq 2.1$.

Additionally, "b" representing the ratio of $Fe^{3+}$ is set to fall within a range of $12.3 \leq b \leq 16.1$. When "b" is less than 12.3 for $1.1 \leq a \leq 2.4$, the spinel phase is generated to lower the coercive force (HcJ). On the other hand, when "b" exceeds 16.1, the M phase and the $Fe_2O_3$ (hematite) phase is generated to lower the saturation magnetization ($4\pi Is$). Accordingly, "b" is set to fall within the range of $12.3 \leq b \leq 16.1$. The preferable range of "b" is $12.9 \leq b \leq 15.6$, and more preferable range of "b" is $12.9 \leq b \leq 14.9$.

When the ferrite magnetic material of the present invention is embodied as a sintered magnet, a Ca constituent and/or a Si constituent derived from for example, $CaCO_3$ and $SiO_2$, respectively, can be included in addition to the composition represented by above formula (1). The inclusion of these constituents permits controlling the coercive force (HcJ), the grain size and the like, and thus permits obtaining a ferrite sintered magnet that simultaneously has a high level of coercive force (HcJ) and a high level of residual magnetic flux density (Br).

The content of the Ca constituent and the content of the Si constituent are preferably set to be as follows, in terms of $CaCO_3$ and $SiO_2$, respectively: $CaCO_3$: 0 to 3.0 wt % and $SiO_2$: 0.2 to 1.4 wt %.

When the content of $SiO_2$ is less than 0.2 wt %, the addition effect of $SiO_2$ is not sufficient. When the content of $CaCO_3$ exceeds 3.0 wt %, there is a fear of generating Ca ferrite that can be a factor to lower the magnetic properties. When the content of $SiO_2$ exceeds 1.4 wt %, the residual magnetic flux density (Br) tends to be lowered. Consequently, the content of the Ca constituent and the content of the Si constituent in the present invention are set to be as follows, in terms of $CaCO_3$ and $SiO_2$, respectively: $CaCO_3$: 0 to 3.0 wt % and $SiO_2$: 0.2 to 1.4 wt %. $CaCO_3$ and $SiO_2$ are included preferably in the ranges of $CaCO_3$: 0.2 to 1.5 wt % and $SiO_2$: 0.2 to 1.0 wt %, respectively, and more preferably in the ranges of $CaCO_3$: 0.3 to 1.2 wt % and $SiO_2$: 0.3 to 0.8 wt %.

The ferrite sintered magnet according to the present invention includes the W-type hexagonal ferrite as a magnetic phase, and the magnetic phase includes Sr and Ba. The inclusion of both of Sr and Ba permits having a fine structure of 0.6 μm or less in mean grain size. The ferrite sintered magnet has a coercive force (HcJ) of 3000 Oe or more, a residual magnetic flux density (Br) of 4600 G or more and a squareness ratio (Hk/HcJ) of 85% or more.

By setting the "x" value in formula (1) to fall within the range of $0.10 \leq x \leq 0.65$, a coercive force (HcJ) of 3200 Oe or more, a residual magnetic flux density (Br) of 4600 G or more and a squareness ratio (Hk/HcJ) of 85% or more can simultaneously be attained.

The composition of the ferrite magnetic material according to the present invention can be measured by means of the X-ray fluorescence quantitative analysis method or the like. The present invention does not exclude the inclusion of constituents other than the main constituent and the additives. For example, a part of the $Fe^{2+}$ sites or the $Fe^{3+}$ sites can be replaced with other elements.

As described above, the ferrite magnetic material of the present invention can form any of a ferrite sintered magnet, a ferrite magnet powder, a bonded magnet as a ferrite magnet powder dispersed in a resin, and a magnetic recording medium as a film-type magnetic phase.

The ferrite sintered magnet and the bonded magnet according to the present invention are processed into predetermined shapes, and are used in the following wide applications. For example, these magnets can be used as motors for vehicles which drive a fuel pomp, a power window, an ABS (antilock break system), a fan, a wiper, a power steering, an active suspension, a starter, a door lock, an electric mirror, or the like. Moreover, these magnets can also be used as motors for office automation or audio-video equipment, which drive an FDD spindle, a VTR capstan, a VTR rotating head, a VTR reel, a VTR loading, a VTR camera capstan, a VTR camera rotating head, a VTR camera zoom, a VTR camera focus, a radio cassette capstan, a CD, LD or MD spindle, a CD, LD or MD loading, or a CD or LD light pickup, or the like. Furthermore, these magnets can also be used as motors for household electrical appliances, which drive an air conditioner compressor, a refrigerator compressor, an electric tool, an electric fan, a microwave oven fan, a microwave oven plate, a mixer, a drier fan, a shaver, or an electric toothbrush, or the like. Still further, these magnets can also be used as motors for factory automation equipment, which drive a robot axis, a joint, a robot, a machine tool table, or a machine tool belt, or the like. As other applications, these magnets can also preferably be used for a motorcycle generator, a magnet used for speakers/headphones, a magnetron tube, a magnetic field generator for MRI, a CD-ROM clamper, a sensor for distributors, a sensor for ABS, a fuel/oil level sensor, a magnet latch, an isolator or the like.

When the ferrite magnet powder of the present invention is used to form a bonded magnet, the mean particle size of the powder is preferably set at 0.1 to 5 μm. The mean particle size of the powder for a bonded magnet is more preferably 0.1 to 2 μm, and furthermore preferably 0.1 to 1 μm. The mean particle size as referred to in the present invention is a number mean particle size, the measurement method of which is as follows. A SEM (scanning electron microscope) photomicrograph is taken; individual particles are identified; and thereafter, for each of the identified particles, the length of the maximum axis passing through the center of mass is determined by means of image analysis, and the length thus determined is defined as the particle size. For each sample, the particle sizes of about 100 particles are measured; the mean value of the grain sizes of all the measured particles is defined as the mean particle size.

When a bonded magnet is produced, a ferrite magnet powder is kneaded with various binders such as a resin, a metal and rubber. Thereafter, the obtained mixture is compacted in a magnetic field or in the absence of a magnetic field. Preferred as binders are an NBR (acrylonitrile butadiene) rubber, chlorinated polyethylene, and a polyamide resin. After compacting, curing is made to yield a bonded magnet. The ferrite magnet powder is preferably subjected to a curing treatment to be described later before being kneaded with the binders.

By using the ferrite magnetic material of the present invention, a magnetic recording medium having a magnetic layer can be produced. The magnetic layer includes a W-type ferrite phase represented by above described composition formula (1). Formation of the magnetic layer can use, for example, the evaporation method and the sputtering method. When the magnetic layer is formed by the sputtering method, the ferrite sintered magnet according to the present invention can also be used as the target. Examples of the magnetic recording medium may include a hard disk, a flexible disk and a magnetic tape.

Next, a preferable method for producing the ferrite magnetic material of the present invention will be described. The method for producing the ferrite sintered magnet of the present invention includes a mixing step, a calcining step, a pulverizing step, a milling step, a step of compacting in a magnetic field, a step of heat treating the compacted body, and a sintering step. The milling step is divided into a first milling step and a second milling step, and a powder heat treatment step is carried out between the first and second milling.

≦Mixing Step>

Each of the raw materials are weighed out, and then mixed and crushed for 1 to 16 hours using a wet attritor, a ball mill or the like. As a raw material powder, an oxide or a compound to be converted into an oxide by sintering can be used. Hereinafter, described is an example in which a $SrCO_3$ powder, a $BaCO_3$ powder and a $Fe_2O_3$ (hematite) powder are used; the $SrCO_3$ powder and the $BaCO_3$ powder can also be added as compounds other than carbonates, for example, as oxides. Similarly for Fe, Fe can be added as compounds other than $Fe_2O_3$. Additionally, compounds containing Sr, Ba and Fe can also be used. In the mixing step, the additives, namely, a $CaCO_3$ powder and a $SiO_2$ powder can also be added.

The mixing ratios of the individual raw materials may be made to correspond to the composition that is intended to be finally obtained, but the present invention is not limited to such a case. For example, any of the $SrCO_3$ powder, $BaCO_3$ powder and the $Fe_2O_3$ powder may be added after calcination to control the composition to be the final composition.

≦Calcining Step>

The mixed powder material obtained in the mixing step is calcined at 1100 to 1400° C. By performing this calcination in a nonoxidative atmosphere of nitrogen gas, argon gas or the like, $Fe^{3+}$ in the $Fe_2O_3$ (hematite) powder is reduced to generate $Fe^{2+}$, and consequently a W-type ferrite is generated. However, if a sufficient amount of $Fe^{2+}$ cannot be ensured at this stage, the M phase or the hematite phase is present in addition to the W phase. For the purpose of obtaining a ferrite including the single W phase, it is effective to control the partial pressure of oxygen. This is because a reduced partial pressure of oxygen facilitates the reduction of $Fe^{3+}$ to generate $Fe^{2+}$.

When the additives have already been added in the mixing step, a ferrite magnet powder can also be obtained by milling the calcined body to a predetermined particle size.

≦Pulverizing Step>

The calcined body is generally granular, and is preferably pulverized. In the pulverizing step, the calcined body is treated until the mean particle size becomes 0.5 to 10 μm with a vibration mill or the like. The powder to be obtained in this step will be referred to as the coarse powder.

≦First Milling Step>

In the first milling step, the coarse powder is milled to a mean particle size of 0.08 to 0.8 μm, preferably 0.1 to 0.4 μm, and more preferably 0.1 to 0.2 μm, by means of wet or dry milling with an attritor, a ball mill, a jet mill or the like. The first milling step is carried out for the purpose of making the coarse powder disappear and further for the purpose of making fine the structure after the sintering in order to improve the magnetic properties, and the specific surface area (based on the BET method) to be obtained is preferably to fall within a range from 20 to 25 $m^2/g$.

When the pulverized powder is subjected to wet milling with a ball mill, the treating time of 60 to 100 hours per 200 g of the pulverized powder may be sufficient, although the treatment time depends on the adopted milling technique.

For the purpose of improving the coercive force and controlling the grain size, powders of $CaCO_3$ and $SiO_2$, or in addition to them, powders of $SrCO_3$, $BaCO_3$, or the like may be added in advance of the first milling step.

≦Powder Heat Treatment Step>

In the powder heat treatment step, the fine powder obtained in the first milling is subjected to a heat treatment in which the fine powder is kept at 600 to 1200° C., more preferably at 700 to 1000° C. for 1 second to 100 hours.

By carrying out the first milling step, ultrafine powders less than 0.1 μm in particle size are inevitably generated. The presence of such ultrafine powders sometimes causes trouble in the subsequent step of compacting in a magnetic field. For example, when the amounts of the ultrafine powders are large in wet compacting, there occur troubles such as unsuccessful compacting because water releasability is poor. Accordingly, in the present embodiment, a heat treatment is carried out in advance of the step of compacting in a magnetic field. Specifically, the heat treatment is carried out for the purpose of reducing the amounts of the ultrafine powders by reacting the ultrafine powders less than 0.1 μm, generated in the first milling, with fine powders of 0.1 μm or more in particle size (for example, 0.1 to 0.2 μm). The ultrafine powders are reduced in amounts by this heat treatment, and the compactibility can thereby be improved.

A nonoxidative atmosphere is adopted for the atmosphere of this heat treatment so that the $Fe^{2+}$ generated by calcination may not be converted into $Fe^{3+}$ by oxidation. The nonoxidative atmosphere in the present invention includes the atmosphere of an inert gas such as nitrogen gas or argon gas. The nonoxidative atmosphere of the present invention allows the inclusion of oxygen in a content of 10 vol % or less. When oxygen is contained in this level, the retention (keeping?) at the above described temperature induces negligible oxidation of $Fe^{2+}$. The oxygen content in the heat treatment atmosphere is preferably 1 vol % or less, and more preferably 0.1 vol % or less.

≦Second Milling Step>

Next, in the second milling step, the heat treated, milled powder is wet or dry milled with an attritor, a ball mill, a jet mill or the like, to a mean particle size of 0.8 μm or less, preferably 0.1 to 0.4 μm, and more preferably 0.1 to 0.2 μm. The second milling step is carried out for the purpose of controlling the particle size, removing necking, and improving the dispersion of the additives, and the specific surface area (based on the BET method) preferably falls within a range from 10 to 20 $m^2/g$, and more preferably from 10 to 15 $m^2/g$. When the specific surface area is controlled to fall within the above described ranges, the amount of the ultrafine particles is small even when the ultrafine particles are present, so that there are no adverse effects on the compactibility. In other words, by carrying out the first milling step, the powder heat treatment step and the second milling step, there is satisfied the requirement that the structure after sintering be made fine without causing adverse effects on the compactibility.

When the milled powder is subjected to wet milling with a ball mill, the treating time of 10 to 40 hours per 200 g of the milled powder may be sufficient, although the treatment time depends on the adopted milling technique. The second milling step is usually carried out under more relaxed milling conditions as compared to the first milling step, because if the second milling step is carried out under the conditions comparable to those for the first milling step, ultrafine powders are generated again, and the desired particle size is essentially attained in the first milling step. Whether or not the second milling step is carried out under more relaxed milling conditions may be determined by referring to the mechanical energy applied to the milling as well as the milling time.

For the purpose of improving the coercive force and controlling the grain size, powders of $CaCO_3$ and $SiO_2$, or in addition to them, powders of $SrCO_3$, $BaCO_3$, or the like may be added in advance of the second milling step.

In advance of the second milling step, there may be added carbon powder that displays the reduction effect in the sintering step. Addition of carbon powder is effective in generation of the W-type ferrite in a state close to a single phase (or in a single phase). The additive amount of the carbon powder (hereinafter, referred to as "carbon amount") is set to fall within a range from 0.05 to 0.7 wt % in relation to the raw material powder. The carbon amount made to fall within this range permits fully enjoying the effect of the carbon powder as a reducing agent in the sintering step to be described below, and also permits obtaining a higher saturation magnetization (as) than without addition of carbon powder. In the present invention, the carbon amount is preferably 0.1 to 0.65 wt % and more preferably 0.15 to 0.6 wt %. As the carbon powder to be added, substances well known such as carbon black can be used.

In the present invention, for the purpose of suppressing segregation of the added carbon powder in the compacted body, a polyhydric alcohol represented by a general formula $C_n(OH)_nH_{n+2}$ is preferably added, in which formula the number n of the carbon atoms is set to be 4 or more. When the number n of the carbon atoms is 3 or less, the effect of suppressing the carbon powder segregation becomes insufficient. The number n of the carbon atoms is preferably 4 to 100, more preferably 4 to 30, furthermore preferably 4 to 20, and yet furthermore preferably 4 to 12. As the polyhydric alcohol, sorbitol is preferable, but two or more polyhydric alcohols may be used in combination. In addition to the polyhydric alcohol used in the present invention, another dispersant well known may also be added.

The above described general formula is a formula for the case where the whole skeleton is composed of a chain and no unsaturated bond is contained. The number of the hydroxy groups and the number of the hydrogen atoms in the polyhydric alcohol may be somewhat smaller than those represented by the general formula. In the above general formula, unsaturated bonds as well as the saturated bonds may be contained. The basic skeleton may be either of a chain or cyclic, but is preferably of a chain. As long as the number of the hydroxy groups is more than 50% of the number n of the carbon atoms, the advantageous effects of the present invention can be realized, but the larger the number of the hydroxy groups, the more preferable, and it is most preferable that the number of the hydroxy groups and the number of the carbon atoms coincides with each other. The additive amount of the polyhydric alcohol may be 0.05 to 5.0 wt %, preferably 0.1 to 3.0 wt %, and more preferably 0.3 to 2.0 wt %, in relation to the powder to which the polyhydric alcohol is added. The added polyhydric alcohol is mostly decomposed to be removed in the step of heat treating the compacted body to be carried out after the step of compacting in a magnetic field. The polyhydric alcohol that has not been decomposed to be removed in the step of heat treating the compacted body and consequently remains is also decomposed to be removed in the subsequent sintering step.

≦Step of Compacting in a Magnetic Field>

The step of compacting in a magnetic field can be carried out either by dry compacting or by wet compacting, but is preferably carried out by wet compacting for the purpose of increasing the degree of the magnetic orientation. Accordingly, hereinafter, a preparation of a slurry for wet compacting will be described, and then the subsequent step of compacting in a magnetic field will be described.

When the wet compacting is adopted, the second milling step is carried out in a wet manner, and the slurry thus obtained is concentrated to prepare a slurry for wet compacting. Such concentration can be carried out with a centrifugal separator, a filter press or the like. In this case, the ferrite magnet powder preferably accounts for 30 to 80 wt % of the slurry for wet compacting. Additionally, water as a dispersing medium is preferably added with surfactants such as gluconic acid (gluconate) and sorbitol. Then, compacting in a magnetic field is carried out with the slurry for wet compacting. The compacting pressure may be of the order of 0.1 to 0.5 ton/cm$^2$, and the applied magnetic field may be of the order of 5 to 15 kOe. The dispersing medium is not limited to water, but nonaqueous dispersing media may also be adopted. When a nonaqueous dispersing medium is used, organic solvents such as toluene and xylene may be used. When toluene or xylene is used as a nonaqueous dispersing medium, a surfactant such as oleic acid is preferably added.

≦Step of Heat Treating the Compacted Body>

In this step, the compacted body is subjected to a heat treatment in which the compacted body is kept at a low temperature of 100 to 450° C., more preferably 200 to 350° C., for 1 to 4 hours. By carrying out this heat treatment in the ambient air, $Fe^{2+}$ is partially oxidized to be converted into $Fe^{3+}$. In other words, in this step, the reaction from $Fe^{2+}$ to $Fe^{3+}$ is allowed to proceed to a certain extent to control the amount of $Fe^{2+}$ to a predetermined amount.

≦Sintering Step>

In the subsequent sintering step, the compacted body is sintered by keeping the compacted body at a temperature of 1100 to 1270° C., more preferably 1160 to 1240° C., for 0.5 to 3 hours. The sintering atmosphere is a nonoxidative atmosphere for the same reason as in the calcining step. In this step, the carbon powder having been added in advance of the second milling step disappears.

By carrying out the above described steps, the W-type ferrite sintered magnet of the present invention can be obtained. According to this W-type ferrite sintered body, a residual magnetic flux density (Br) of 4600 G or more, and further, 4650 G or more can be attained, and a coercive force (HcJ) of 3000 Oe or more, and further, 3300 Oe or more can be attained. The present invention can use the obtained W-type ferrite sintered magnet as a ferrite magnet powder by milling the sintered magnet concerned. The ferrite magnet powder can be used for a bonded magnet.

The method for producing a ferrite sintered magnet is described above, and the same steps can be appropriately adopted when the ferrite magnet powder is produced. The ferrite magnet powder according to the present invention can be produced by the following two processes: one process produces from the calcined body, and the other process produces from the sintered body.

When producing from a calcined body, $CaCO_3$ and $SiO_2$ are added in advance of the calcining step. A calcined body obtained by adding $CaCO_3$ and $SiO_2$ is subjected to pulverizing, powder heat treatment and milling to yield a ferrite magnet powder. This ferrite magnet powder is subjected to the above described heat treatment and thereafter can be practically used as a ferrite magnet powder. For example, a bonded magnet is produced by using the ferrite magnet powder having been subjected to powder heat treatment. This ferrite magnet powder is not only applied to the bonded magnet, but can be applied to the production of a ferrite sintered magnet. Accordingly, it can be said that the ferrite magnet powder is produced in the course of the production of the ferrite sintered magnet. However, the particle size of such a ferrite magnet powder is sometimes varied from the application thereof to a bonded magnet and to the application thereof to a ferrite sintered magnet.

When a ferrite magnet powder is produced from a ferrite sintered magnet, $CaCO_3$ and $SiO_2$ may be added in any step in advance of the sintering step. A ferrite magnet powder can be produced by appropriately milling the ferrite sintered magnet that has been obtained by applying the above described steps.

As described above, the ferrite magnet powder may include the forms of a calcined powder, a powder obtained by calcination, sintering and subsequent milling, and a powder obtained by calcination, subsequent milling and subsequent heat treatment.

EXAMPLE 1

First, as raw material powders, a $Fe_2O_3$ powder (primary particle size: 0.3 μm), a $SrCO_3$ powder (primary particle size: 2 μm) and a $BaCO_3$ powder (primary particle size: 0.05 μm) were prepared. These raw material powders were weighed out so as to give each of the mixture compositions shown in FIG. 1, and subjected to mixing and milling for 2 hours in a wet attritor.

Next, each of the mixtures thus obtained was calcined. The calcination was carried out with a tubular furnace under the conditions such that the mixture was kept in an atmosphere of $N_2$ gas for 1 hour. The heat-retention temperature was set at 1300° C., and the rate of the temperature increase up to the heat-retention temperature and the rate of temperature decrease from the heat-retention temperature were set at 5° C./min.

Next, each of the calcined bodies thus obtained was crushed with a vibration mill. The crush with a vibration mill was such that the 220 g of the calcined body was treated for 10 minutes.

A subsequent milling was carried out in two separate stages with a ball mill. A first milling was such that 210 g of the pulverized powder was added with 400 ml of water and treated for 88 hours.

After the first milling, the milled powder was heat treated under the conditions that the milled powder was kept at 800° C. for 10 minutes to 1 hour in the atmosphere of $N_2$ gas. The rate of the temperature increase up to the heat-retention temperature and the rate of temperature decrease from the heat-retention temperature were set at 5° C./min.

Successively, a second milling in which wet milling was carried out with a ball mill was carried out to yield a slurry for wet compacting. In advance of the second milling, the milled powder subjected to the above described heat treatment was added with 0.6 wt % of $SiO_2$ powder (primary particle size: 0.01 μm), 0.7 wt % of $CaCO_3$ powder (primary particle size: 1 μm), 0.7 wt % of $SrCO_3$ powder (primary particle size: 2 μm), 0.4 wt % of a carbon powder (primary particle size: 0.05 μm), and 1.2 wt % of sorbitol (primary particle size: 10 μm) as a polyhydric alcohol.

Each of the slurries obtained by carrying out the second milling was concentrated with a centrifugal separator, and the compacting in a magnetic field was carried out with the concentrated slurry for wet compacting. The applied magnetic field (vertical magnetic field) was 12 kOe (1000 kA/m), and each of the compacted bodies had a cylindrical shape of 30 mm in diameter and 15 mm in height. In any of the compacting operations, no trouble was caused. Each of the compacted bodies was heat treated at 300° C. for 3 hours in the ambient air, and thereafter sintered in nitrogen at a rate of temperature increase of 5° C./min and at a maximum temperature of 1190° C. for 1 hour to yield a sintered body. The composition of each of the thus obtained sintered bodies was measured with an X-ray fluorescence quantitative analyzer SIMULTIX 3550 manufactured by Rigaku Denki Co., Ltd.

Next, the coercive force (HcJ), the residual magnetic flux density (Br) and the squareness ratio (Hk/HcJ) of each of the obtained sintered bodies were measured. The results obtained are shown in FIG. 1. The upper and lower surfaces of each of the sintered bodies thus obtained were processed, and then the coercive force (HcJ) and the residual magnetic flux density (Br) were evaluated using a B—H tracer with a maximum applied magnetic field of 25 kOe. Here, Hk represents an external magnetic field strength at which the magnetization reaches 90% of the residual magnetic flux density (Br) in the second quadrant in the magnetic hysteresis loop. When Hk is low, a high maximum energy product cannot be obtained. Hk/HcJ is an index for the magnet performance, and represents the angularness in the second quadrant in the magnetic hysteresis loop. The measured results are shown in FIG. 1.

The mean grain size of each of the obtained sintered bodies was measured. The results obtained are shown in FIG. 1. As shown in FIG. 1, the measurement of the mean grain size was carried out as follows. The A plane (the plane including the a-axis and c-axis) of each of the sintered bodies was mirror finished, and then subjected to acid etching; a SEM (scanning electron microscope) photomicrograph was taken; the individual particles were identified; and thereafter, for each of the identified particles, the length of the maximum axis passing through the center of mass was determined by means of image analysis, and the length thus determined was defined as the grain size of the sintered body. For each sample, the grain sizes of about 100 particles were measured; the mean value of the grain sizes of all the measured particles was defined as the mean grain size.

Figure 3:
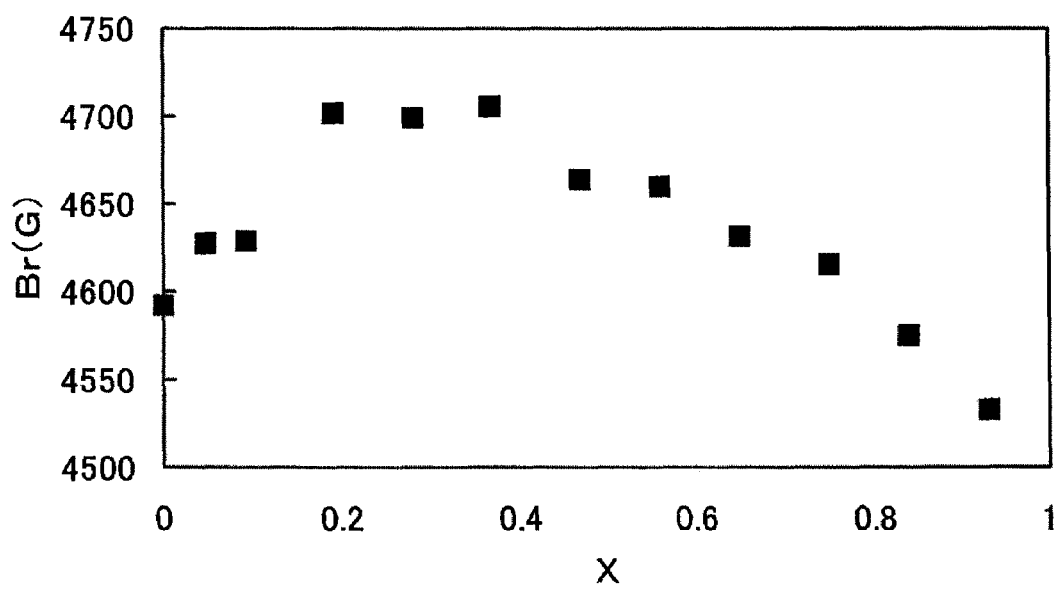
FIG. 3 is a graph showing the relation between the "x" value in $Sr_{(1-x)}Ba_xFe^{2+}{}_aFe^{3+}{}_bO_{27}$ and the residual magnetic flux density (Br) in Example 1.

The phases of the obtained sintered bodies were identified by X-ray diffraction. The results obtained are shown in FIG. 1. All the sintered bodies contained the M phase with a content of the order of 5 to 20% in terms of molar ratio ("W+M" in FIG. 1). In the present embodiment, the molar ratios were derived with reference to the X-ray diffraction intensities obtained for the samples in which the powders of W-type ferrite, M-type ferrite, hematite and spinel were mixed together in predetermined ratios. The following conditions were applied to the X-ray diffraction:

X-ray generator: 3 kW
Tube voltage: 45 kV
Tube current: 40 mA
Sampling width: 0.02 deg
Scanning speed: 4.00 deg/min
Divergence slit: 1.00 deg
Scattering slit: 1.00 deg
Receiving slit: 0.30 mm FIG. 2 shows the relation between "x" in $Sr_{(1-x)}Ba_xFe^{2+}_aFe^{3+}_bO_{27}$ and the coercive force (HcJ); FIG. 3 shows the relation between "x" in $Sr_{(1-x)}Ba_xFe^{2+}_aFe^{3+}_bO_{27}$ and the residual magnetic flux density (Br); and FIG. 4 shows the relation between "x" in $Sr_{(1-x)}Ba_xFe^{2+}_aFe^{3+}_bO_{27}$ and the mean grain size.

As can be seen from FIGS. 2 and 3, as "x" is increased, in other words, the amount of Ba to replace Sr is increased, the coercive force (HcJ) and the residual magnetic flux density (Br) are improved. However, the improvement effects of coercive force (HcJ) and the residual magnetic flux density (Br) each have a peak. From the above described results, in the present invention, "x" is set to fall within the range of $0.03 \leq x \leq 0.8$.

Figure 4:
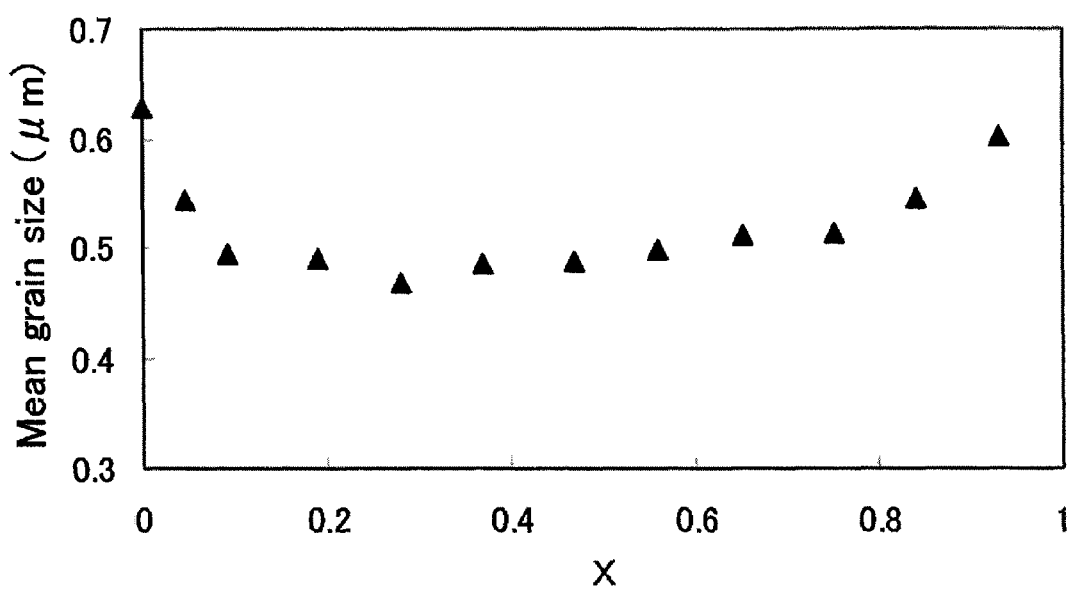
FIG. 4 is a graph showing the relation between the "x" value in $Sr_{(1-x)}Ba_xFe^{2+}{}_aFe^{3+}{}_bO_{27}$ and the mean grain size in Example 1.

On the other hand, as can be seen from FIG. 4, the partial replacement of Sr with Ba makes the grains finer. The tendency of the effect of making finer the grains is in accordance with the tendency of the improvement effect of the coercive force (HcJ), and consequently, the improvement effect of the coercive force (HcJ) is understood to be ascribable to the grains made finer.

EXAMPLE 2

Sintered bodies were produced under the same manner as in No. 5 of Example 1 except that in the second milling, 0.4 wt % of carbon powder (primary particle size: 0.05 μm) and 1.2 wt % of sorbitol (primary particle size: 10 μm) were added and the compounds shown in FIG. 5 were also added; the coercive force (HcJ), the residual magnetic flux density (Br) and the squareness ratio (Hk/HcJ) of each of the sintered bodies were measured in the same manner as in Example 1. The results thus obtained are shown in FIG. 5. Each of the obtained sintered bodies was subjected to composition analysis in the same manner as in Example 1. The results obtained are shown in FIG. 6.

As shown in FIGS. 5 and 6, within the ranges of "x", "a" and "b" of the present invention, by controlling the additives in the second milling, a coercive force (HcJ) of 3500 Oe or more, or 3600 Oe or more can be obtained while keeping a residual magnetic flux density (Br) of 4600 G or more.

EXAMPLE 3

Sintered bodies were obtained under the same conditions as in Example 1 except that the weighed amounts of the $Fe_2O_3$ powder (primary particle size: 0.3 μm), the $SrCO_3$ powder (primary particle size: 2 μm) and the $BaCO_3$ powder (primary particle size: 0.05 μm) and the heat treatment temperatures of the compacted bodies were altered so that the "a", "b" and "x" values in the above formula (1) might finally be the values shown in FIG. 7; the magnetic properties of each of the obtained sintered bodies were evaluated under the same conditions as in Example 1. The results thus obtained are shown in FIG. 7.

As shown in FIG. 7, when the "a", "b" and "x" values were set to fall within the ranges recommended by the present invention, a coercive force (HcJ) of 3000 Oe or more, a residual magnetic flux density (Br) of 4600 G or more and a squareness ratio (Hk/HcJ) of 85% or more were able to be simultaneously attained.

The phases of the obtained sintered bodies were also identified under the same conditions as in Example 1 by X-ray diffraction. The results thus obtained are also shown in FIG. 7; some sintered bodies were found to contain the M phase, but the proportions of the M phase were found to be of the order of 0 to 20% in terms of molar ratio.

The invention claimed is:

1. A ferrite magnetic material characterized by comprising an oxide having a composition wherein:
   metal elements Sr, Ba and Fe in total have a composition ratio represented by the formula $Sr_{(1-x)}Ba_xFe^{2+}{}_aFe^{3+}{}_b$ in which
   $0.03 \leq x \leq 0.80$,
   $1.5 \leq a \leq 2.1$, and
   $12.3 \leq b \leq 16.1$, and
   one or two of a Ca constituent and a Si constituent as additives in the following amounts, respectively, in terms of $CaCO_3$ and $SiO_2$:
   $CaCO_3$: 0 to 3.0 wt % and $SiO_2$: 0.2 to 1.4 wt %.

2. The ferrite magnetic material according to claim 1, characterized in that said oxide is represented by $Sr_{(1-x)}Ba_xFe^{2+}{}_aFe^{3+}{}_bO_{27}$.

3. The ferrite magnetic material according to claim 1, characterized in that the ferrite magnetic material comprises a W-type hexagonal ferrite as a main phase.

4. The ferrite magnetic material according to claim 1, characterized in that said x falls within a range of $0.10 \leq x \leq 0.65$.

5. The ferrite magnetic material according to claim 1, characterized in that the ferrite magnetic material forms any of a ferrite sintered magnet, a ferrite magnet powder, a bonded magnet as a ferrite magnet powder dispersed in a resin, and a magnetic recording medium as a film-type magnetic phase.

6. The ferrite magnetic material according to claim 5, characterized in that said ferrite sintered magnet has a mean grain size of 0.6 μm or less.

7. A ferrite sintered magnet, characterized in that the ferrite sintered magnet comprises a W-type hexagonal ferrite comprising Sr and Ba as a magnetic phase and is comprised of a sintered body having a mean grain size of 0.6 μm or less.

8. The ferrite sintered magnet according to claim 7, characterized in that the ferrite sintered magnet has a coercive force (HcJ) of 3000 Oe or more, a residual magnetic flux density (Br) of 4600 G or more and a squareness ratio (Hk/HcJ) of 85% or more.

9. The ferrite sintered magnet according to claim 7, characterized in that Ba/Sr+Ba (molar ratio) is 0.03 to 0.80.

10. The ferrite sintered magnet according to claim 7, characterized in that Ba/Sr+Ba (molar ratio) is 0.10 to 0.65.

11. The ferrite sintered magnet according to claim 10, characterized in that the ferrite sintered magnet has a coercive force (HcJ) of 3200 Oe or more, a residual magnetic flux density (Br) of 4600 G or more and a squareness ratio (Hk/HcJ) of 85% or more.

12. The ferrite sintered magnet according to claim 7, wherein:
   the sintered body has a composition wherein:
   metal elements Sr, Ba and Fe in total have a composition ratio represented by the formula $Sr_{(1-x)}Ba_xFe^{2+}{}_aFe^{3+}{}_b$ in which
   $0.03 \leq x \leq 0.80$,
   $1.1 \leq a \leq 2.4$, and
   $12.3 \leq b \leq 16.1$.

13. The ferrite sintered magnet according to claim 7, wherein one or two of a Ca constituent and a Si constituent as additives in the following amounts, respectively, in terms of $CaCO_3$ and $SiO_2$:
   $CaCO_3$: 0 to 3.0 wt % and $SiO_2$: 0.2 to 1.4 wt %.

14. The ferrite sintered magnet according to claim 12, wherein said oxide is represented by $Sr_{(1-x)}Ba_xFe^{2+}{}_aFe^{3+}{}_bO_{27}$.

15. The ferrite sintered magnet according to claim 12, wherein said x falls within a range of $0.10 \leq x \leq 0.65$.

* * * * *